US008628284B2

(12) United States Patent
Mårtensson et al.

(10) Patent No.: US 8,628,284 B2
(45) Date of Patent: Jan. 14, 2014

(54) LOCKING PLATE TO BE USED IN A LOCKING ARRANGEMENT AND SUCH A LOCKING ARRANGEMENT

(75) Inventors: Jan Mårtensson, Katrineholm (SE); Leif Rickardsson, Katrineholm (SE); Niklas Kristoffersson, Katrineholm (SE); Jonny Nystedt, Katrineholm (SE); Beatrice Stranz, Norrköping (SE)

(73) Assignee: Aktiebolaget SKF, Göteborg (SE)

( * ) Notice: Subject to any disclaimer, the term of this patent is extended or adjusted under 35 U.S.C. 154(b) by 173 days.

(21) Appl. No.: 13/140,522

(22) PCT Filed: Nov. 11, 2009

(86) PCT No.: PCT/SE2009/000489
§ 371 (c)(1), (2), (4) Date: Aug. 26, 2011

(87) PCT Pub. No.: WO2010/071535
PCT Pub. Date: Jun. 24, 2010

(65) Prior Publication Data
US 2011/0299956 A1    Dec. 8, 2011

(30) Foreign Application Priority Data
Dec. 19, 2008    (SE) ........................................ 0802627

(51) Int. Cl.
*F16B 39/10* (2006.01)
(52) U.S. Cl.
USPC ............................................ 411/197; 411/221
(58) Field of Classification Search
USPC ........ 411/197–201, 216, 217, 993, 994, 985, 411/315, 124, 204, 221, 321
See application file for complete search history.

(56) References Cited

U.S. PATENT DOCUMENTS

| 913,174 | A | * | 2/1909 | Stall | 411/216 |
| 974,073 | A | * | 10/1910 | Kesberger | 411/126 |
| 1,320,962 | A | * | 11/1919 | Andrix | 411/201 |
| 4,090,545 | A | | 5/1978 | Ritter, Jr. | |
| 5,094,117 | A | | 3/1992 | Mikel et al. | |
| 5,533,794 | A | * | 7/1996 | Faison | 301/105.1 |

(Continued)

FOREIGN PATENT DOCUMENTS

| DE | 20302843 U1 | 4/2003 |
| GB | 190924313 A | 3/1910 |
| WO | WO2005093269 A1 | 10/2005 |

*Primary Examiner* — Gary Estremsky
(74) *Attorney, Agent, or Firm* — Bryan Peckjian; SKF USA Inc. Patent Department

(57) ABSTRACT

The present invention refers to a locking plate (1) to be used in a locking arrangement for securing a shaft nut (8) on a threaded shaft (13) having an axial groove (15) in its envelope surface, said locking plate (1) having a first end (1a) and a second end (1b) and means (11) for its attachment to the shaft nut (8), a portion (7) of said locking plate projecting inwardly and being intended to enter in said axial groove (15) in the threaded shaft (13), the locking plate having a first (4) and a second (5) spaced apart and aligned, elongated arch-formed through-hole, with an intermediate non-slotted material portion (6), the inwardly projecting portion (7) of the locking plate being positioned non-symmetrically in relation to said intermediate non-slotted material portion (6) between the said first (4) and second (5) spaced apart elongated arch-formed through-holes, and also to a locking arrangement incorporating such a locking plate.

8 Claims, 3 Drawing Sheets

(56) References Cited

U.S. PATENT DOCUMENTS

| | | | |
|---|---|---|---|
| 5,562,378 A * | 10/1996 | Blechschmidt et al. | 411/121 |
| 5,674,034 A * | 10/1997 | Bennett | 411/197 |
| 5,755,824 A * | 5/1998 | Blechschmidt et al. | 470/42 |
| 6,095,735 A | 8/2000 | Weinstein et al. | |
| 6,290,442 B1 * | 9/2001 | Peterkort | 411/140 |
| 2006/0029485 A1 | 2/2006 | Weinstein | |
| 2007/0052287 A1 * | 3/2007 | White et al. | 301/132 |

* cited by examiner

LOCKING PLATE TO BE USED IN A LOCKING ARRANGEMENT AND SUCH A LOCKING ARRANGEMENT

CROSS-REFERENCE

This application is the US national stage of International Application No. PCT/SE2009/000489 filed on Nov. 11, 2009, which claims priority to Swedish Patent Application No. SE 0802627-0 filed on Dec. 19, 2008.

FIELD OF INVENTION

The present invention refers to a locking plate to be used in a locking arrangement for securing that a shaft nut on a threaded shaft is not unintentionally unscrewed, and also to a locking arrangement incorporating such a locking plate.

BACKGROUND OF INVENTION

Shaft nuts, which are tightened on a thread in the envelope surface of a shaft are used for securing that components fitted to the shaft are maintained in a substantially fixed position. In order to ascertain that the shaft nut is not screwed off unintentionally or as a result of oscillations and movement of the shaft or the component, it has been used locking arrangements incorporating a locking plate, which can be attached to the shaft nut and has an inwardly projecting portion arranged to fit into one of a number of corresponding, axial grooves provided in the shaft. Such an arrangement will prevent unscrewing of the shaft nut. There can only be a limited number of axial grooves in the envelope surface of the shaft and a limited number of apertures in the shaft nut in which the locking plate can be attached, and therefore there is a problem to get the inwardly projecting part of the locking plate register exactly with a groove in the shaft, when the shaft nut has been tightened to a desired position.

U.S. Pat. No. 4,090,545 discloses such a locking plate which has an arcuate body portion having two circular bolt holes for attachment bolts to be screwed into the apertures in the shaft nut. The spacing between the two bolt holes is equal to the distance between two adjacent apertures in the shaft nut. The inwardly projecting portion of this locking plate is offset from the center of the locking plate particularly 4,5°, enabling a larger number of possibilities of alignment between the shaft grooves and the inwardly projecting portion. With this locking plate and locking arrangement it is certainly possible to find tightening positions for the shaft nut, which only require that the shaft nut is turned backwards a few degrees. However, this means that it can not be guaranteed that the locking arrangement according to this patent can provide a positive locking of the shaft nut with an optimal tightness.

DE 203 02 843 U1 discloses another locking arrangement with a locking plate having an inwardly projecting portion arranged to enter in a groove in a shaft, whereby the end of the projecting portion is bent sideways for entering in the shaft groove under the shaft nut. This locking plate is secured to the shaft nut with only one bolt, which extends through an elongated hole in the locking plate and is screwed in into one of the threaded bores in the side face of the shaft nut. The inwardly projecting portion of the locking plate is positioned at one of the ends of the locking plate. The fact that the bolt arresting the locking plate to the shaft nut extends through said elongated hole, means that it is possible to find many positions where the position of the inwardly projecting portion of the locking plate can be brought to coincide with the position for an axial groove in the shaft. The fact that the locking plate is secured with only one bolt, which furthermore is not positively guided by the aperture in the locking plate, means that the strength of the grip between the locking plate and the shaft nut is rather low, which is compensated with an intermediate washer having raised portions, having the effect of cutting itself into the opposed side faces of the locking plate and of the shaft nut. As the end of the inwardly projecting portion is bent like an L, does further mean that the locking plate always must be positioned with the side of the locking plate where the end portion projects in the same direction, which reduces the possibilities of reaching registering positions between projecting end and axial shaft groove.

SUMMARY OF THE INVENTION

The present invention is directed to overcome at least one of the problems or drawbacks of the earlier known locking plates and locking arrangements, and this has been achieved by a locking plate to be used in a locking arrangement for securing a shaft nut on a threaded shaft having an axial groove in its envelope surface, which locking plate has a first end and a second end and means for its attachment to the shaft nut, where a portion of said locking plate is projecting inwardly and is intended to enter in said axial groove in the threaded shaft, which locking plate has a first and a second spaced apart and aligned, elongated arch-formed through-hole, with an intermediate non-slotted material portion, whereby the inwardly projecting portion of the locking plate is positioned non-symmetrically in relation to said intermediate non-slotted material portion between the said first and second spaced apart elongated arch-formed through-holes.

BRIEF DESCRIPTION OF THE DRAWINGS

Hereinafter the present invention will be illustrated with reference to an embodiment illustrated in the accompanying drawings.

DESCRIPTION OF THE PREFERRED EMBODIMENTS

Figure 1:
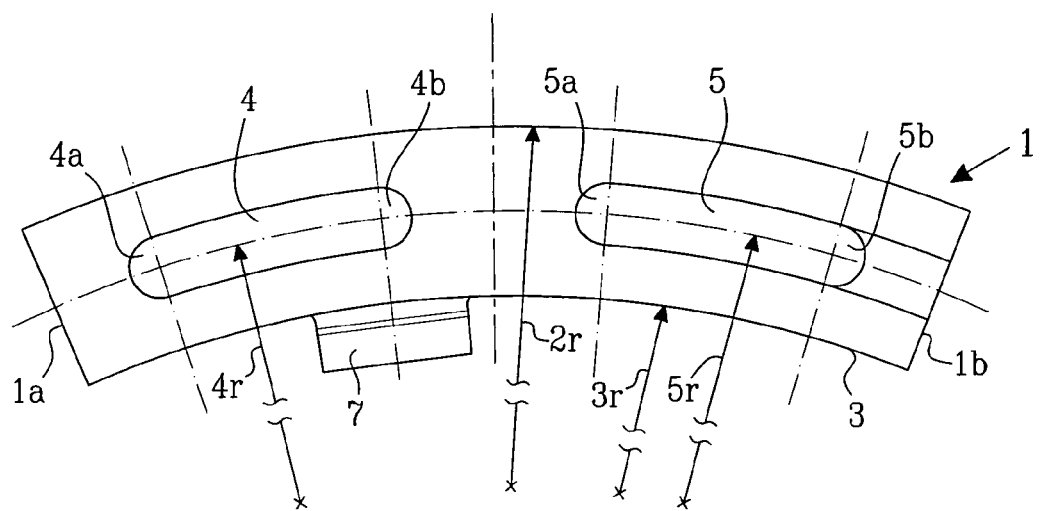
FIG. 1 shows a planar view of a locking plate according to the invention.

FIG. 1 shows in a planar view a locking plate 1 according to the invention. The locking plate 1 is intended to secure a shaft nut fitted to a not shown shaft provided with a threaded end portion, and at least one axial groove in its envelope surface. The locking plate 1 has a first end 1a and a second end 1b, a curved outer contour 2 and a curved inner contour 3, and two spaced apart elongated, arch-formed through-holes 4 and 5 with an intermediate non-slotted material portion 6. The outer contour 2, the inner contour 3 and the arch-formed through-holes 4, 5 all have radii $2r$, $3r$, $4r$ and $5r$, which all meet in a common point A (see FIG. 3). The two elongated arch-formed through-holes 4, 5 are of the same length, and the intermediate portion 6 is of substantially the same length as one of the two through-holes. Each through-hole 4, 5 has semi-circular ends 4a, 4b and 5a, 5b resp., and the center lines of the semi-circular end portions of the elongated through-holes 4, 5 will also meet in said common point A.

The locking plate 1 is furthermore provided with an inwardly projecting portion 7, which in the embodiment illustrated is formed integrally with the locking plate 1, and which extends radially inwardly a distance mainly corresponding to the depth of the axial groove provided in the envelope surface of the shaft. This radially inwardly projecting portion 7 is positioned non-symmetrically in relation to said intermediate non-slotted material portion 6 between the said first 4 and a second 5 spaced apart elongated arch-formed through-holes. In this embodiment the central portion of the inwardly projecting portion 7 is arranged at the radius of the semi-circular end portion 4b of one of the elongated arch-formed through-holes 4, 5, and more precisely at one end portion 4b adjacent the adjacent end portion 5a of the other elongated arch-formed through-hole 5.

Figure 2:
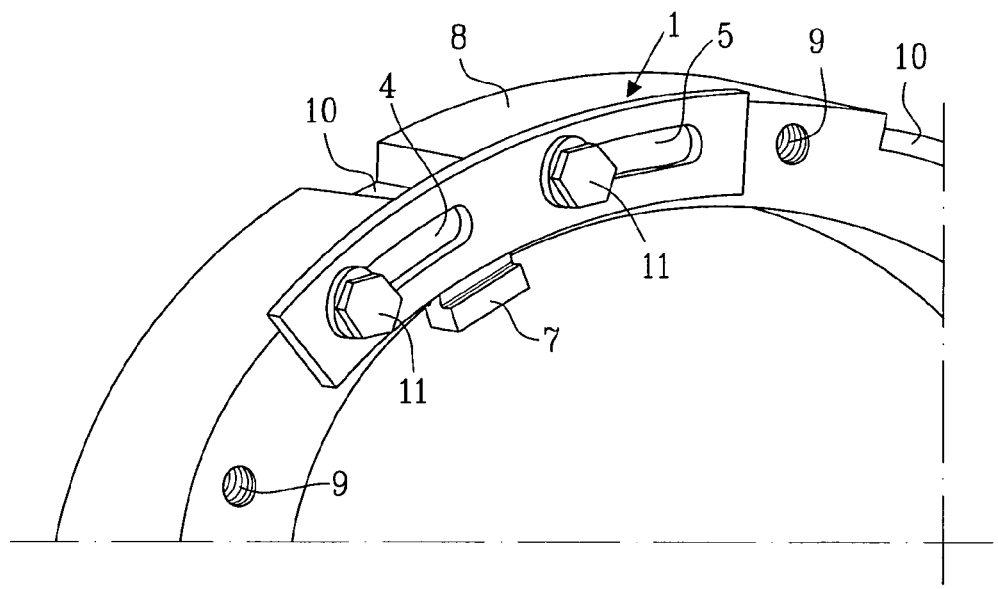
FIG. 2 is a perspective view of the locking plate in FIG. 1 attached to the side face of a shaft nut, shown partially.

FIG. 2 is a perspective view of the locking plate 1, which is attached to a shaft nut 8, a portion of which is illustrated. The shaft nut 8 has a number of evenly spaced, threaded bores 9 in a side surface thereof, and the outer envelope surface has a number of evenly spaced apart gripping recesses 10 for a not shown tool for tightening the nut on the shaft thread.

The locking plate 1 is attached to the side face of the shaft nut 8, via bolts 11 extending through the elongated through-holes 4, 5 and being screwed into threaded bores 9 in the side face of the shaft nut 8. As can be seen, the outer end of the substantially radially inwardly projecting portion 7 has a T-shaped cross-section, whereby the locking plate 1 can be used either in the position illustrated or reversed with the surface facing away from the shaft nut 8 in the illustration engaging the side face of the shaft nut 8. As a consequence of the T-shaped end of the inwardly projecting portion, one limb of the T-shaped end will always be in position for engaging the axial groove in the shaft.

Figure 3:
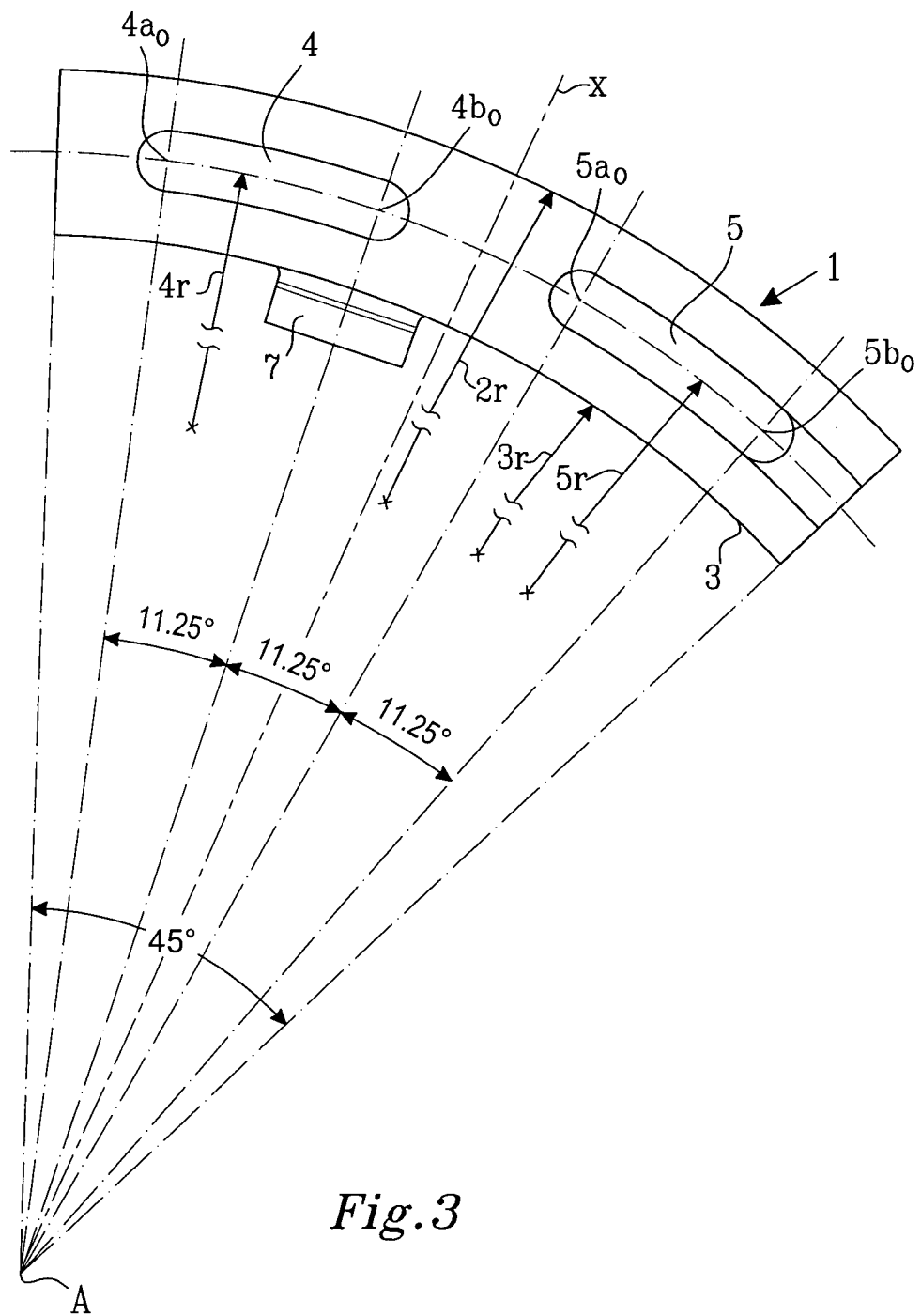
FIG. 3 is a planar view of the locking plate according to the invention shown with a center of the curvature of the plate and with angular measures according to a preferred embodiment.

FIG. 3 shows in a planar view the locking plate 1 according to the invention with a center A of curvature for the plate and illustrating angular measures according to a preferred embodiment.

In the illustrated embodiment, the curved locking plate 1, thus has an arch length of 45°, and the arch length between the centers $4a_0$ and $4b_0$ of the semi-circular end portions of the arch-formed through-hole 4, between the centers $5a_0$ and $5b_0$ of the semi-circular end portions of the arch-formed through-hole 5, and between the adjacent centers $4b_0$ and $5a_0$ of the semi-circular end portions of the arch-formed through-holes 4 and 5 are all equal and substantially 11,25°. It is also evident that the radially inwardly projecting part 7 of the locking plate 1 is positioned offset from the central line X of the locking plate, and in the embodiment it is instead centered about the center line for the semi-circular end portion $4b_0$, thus that it is non-symmetrical to the material portion 6 between the two elongated, arch-formed through-holes 4 and 5.

Figure 4:
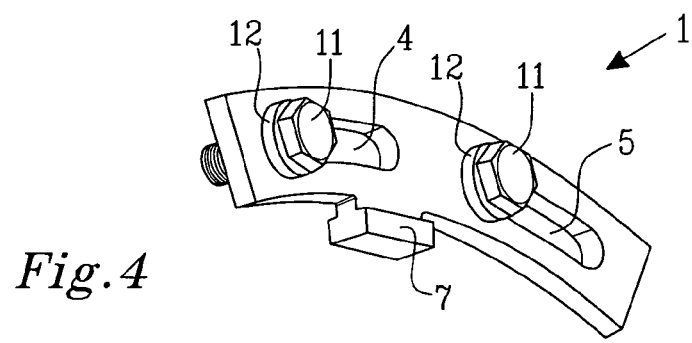
FIG. 4 is a perspective view of the locking plate according to the invention shown with attachment bolts.

FIG. 4 shows in perspective the locking plate 1 according to the invention with attachment bolts 11 fitted through the through-holes 4 and 5. Between the head of the bolt 11 and the side of the locking plate facing the bolt head is provided a washer 12, preferably having a locking function, such as for instance the locking washer named NORD-LOCK. Other types of locking washers can of course also be used.

Figure 5:
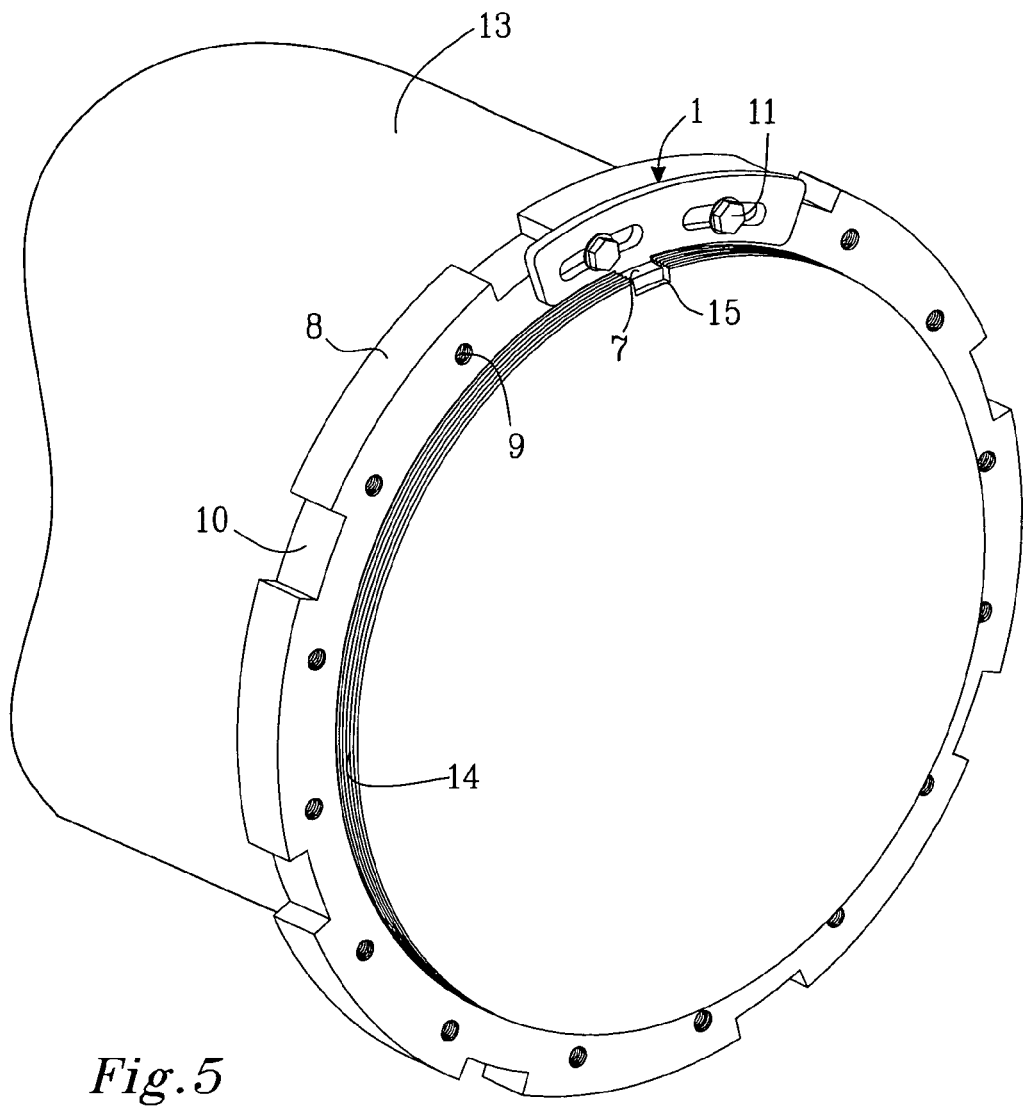
FIG. 5 is a perspective view showing a portion of a threaded shaft with a shaft nut and a locking plate according to the invention.

In FIG. 5 is shown in perspective a portion of a shaft 13 with a threaded end portion 14, and with a shaft nut 8 screwed up on the shaft thread. In the embodiment illustrated the shaft nut has eight evenly spaced gripping recesses 10 in its outer envelope surface, and in the side face there is in the illustrated embodiment provided sixteen evenly spaced threaded bores 9, in two of which has been screwed in attachment bolts 11 for affixing the locking plate 1 to the shaft 13. The shaft is provided with an axial groove 15 in which the radially inwardly projecting portion 7 of the locking plate is intended to engage.

Due to the fact that the arc length of the elongated arch-formed through-holes 4, 5 is substantially 360°/(2×n), where n is the number of evenly spaced apart threaded bores 9 in the shaft nut, it is possible with the design of the locking plate as defined to easily find a pair of adjacent bores 9 to which the locking plate 1 can be attached and still having the inwardly projecting part 7 engaging the axial recess 15 in the shaft 13. The T-shaped end portion of the projecting portion 7 allows reversal of the locking plate 1. In the embodiment illustrated in the different drawing figures, the length of the arch of the elongated arch-formed through-hole, between the centers of the circular end walls is anyone of 11.25°, and the number n of evenly spaced apart threaded bores in the shaft nut is sixteen. However, the arch-length can also be 22.5°, when the number n of evenly spaced apart threaded bores in the shaft nut is eight or 45°, when the number n of evenly spaced apart threaded bores in the shaft nut is four.

The invention is not limited to the embodiment illustrated in the drawings and described with reference thereto, but variants and modifications are possible within the scope of the appended claims. Thus it has for instance been stated that the shaft on which the shaft nut is applied has a threaded end portion, but is of course also possible that the shaft is provided with a sleeve, such as a clamping sleeve, an adapter sleeve or a sleeve which has been shrunk on the shaft, having such an external thread. Also the axial groove in which the inwardly projecting portion of the locking plate engages can be arranged in such a sleeve rather than in the shaft itself.

The invention claimed is:

1. A locking plate for a locking arrangement for securing a shaft nut on a threaded shaft, the threaded shaft having an axial groove in an outer envelope surface, the locking plate comprising:
    a plate attachable to the shaft nut and having a first end, a second end, an inwardly projecting portion disposeable at least partially within the axial groove in the threaded shaft, and first and second elongated through-holes, the through-holes being generally aligned and spaced-apart so as to define an intermediate non-slotted material portion, the inwardly projecting portion of the locking plate being positioned non-symmetrically in relation to the intermediate non-slotted material portion,
    wherein the plate has opposing flat sides separately disposeable against the shaft nut and the inwardly projecting portion of the locking plate has a generally T-shaped end such that the projecting portion is disposeable within the shaft axial groove when either one of the flat sides of the locking plate is disposed against the nut.

2. The locking plate as recited in claim 1, wherein each one of the first and second through-holes has an inner end, the inner ends of the two through holes being generally adjacent to each other, and the inwardly projecting portion of the locking plate is positioned radially inwardly of the inner end of one of the two through-holes.

3. The locking plate as recited in claim 1, wherein each one of the first and second through-holes include a curved slot with semi-circular end walls, one semi-circular end wall of each curved slot being generally adjacent to one end wall of the other curved slot, and wherein the inwardly projecting portion is positioned radially inwardly of the center of one of the two generally adjacent semi-circular end walls.

4. A locking plate for a locking arrangement for securing a shaft nut on a threaded shaft, the threaded shaft having an axial groove in an outer envelope surface, the locking plate comprising:

a plate attachable to the shaft nut and having a first end, a second end, an inwardly projecting portion disposeable at least partially within the axial groove in the threaded shaft, and first and second elongated through-holes, the through-holes being generally aligned and spaced-apart so as to define an intermediate non-slotted material portion, the inwardly projecting portion of the locking plate being positioned non-symmetrically in relation to the intermediate non-slotted material portion, wherein the length of the first elongated through-hole is substantially equal to the length of the second elongated through-hole.

5. A locking plate for a locking arrangement for securing a shaft nut on a threaded shaft, the threaded shaft having an axial groove in an outer envelope surface, the locking plate comprising:

a plate attachable to the shaft nut and having a first end, a second end, an inwardly projecting portion disposeable at least partially within the axial groove in the threaded shaft, and first and second elongated through-holes, the through-holes being generally aligned and spaced-apart so as to define an intermediate non-slotted material portion, the inwardly projecting portion of the locking plate being positioned non-symmetrically in relation to the intermediate non-slotted material portion, wherein the distance between the first and second elongated through-holes is substantially equal to the length of each one of the two through-holes.

6. A locking arrangement for securing a shaft nut on a threaded shaft, the nut having two, opposing side faces and the threaded shaft having an outer envelope surface, the locking arrangement comprising:

the threaded shaft having at least one axial groove provided in the outer envelope surface, a plurality of spaced apart threaded bores extending into the shaft nut from one of the two side faces, a locking plate having opposing sides separately disposeable against the shaft nut, a first end, a second end, an inwardly projecting portion disposable at least partially within the axial groove in the threaded shaft so as to prevent relative rotation between the shaft and the nut, and first and second elongated through-holes each having a width, the through-holes being generally aligned and spaced-apart so as to define an intermediate non-slotted material portion, the inwardly projecting portion of the locking plate being positioned non-symmetrically in relation to the intermediate non-slotted material portion, wherein the elongated through-holes of the locking plate are arranged to be in alignment with two adjacent threaded bores in the shaft nut, two bolts each having a head larger than the width of the elongated through-holes, each bolt being inserted through a separate one of the through-holes and screwed into one of the threaded bores in the shaft nut, a locking washer positioned between the head of each bolt and the adjacent side of the locking plate, and wherein the non-symmetrically positioned inwardly projecting portion of the locking plate enables adjustment of the locking plate along the length of the through-holes.

7. A locking arrangement for securing a shaft nut on a threaded shaft, the nut having two, opposing side faces and the threaded shaft having an outer envelope surface, the locking arrangement comprising:

the threaded shaft having at least one axial groove provided in the outer envelope surface, a plurality of spaced apart threaded bores extending into the shaft nut from one of the two side faces, a locking plate having opposing sides separately disposeable against the shaft nut, a first end, a second end, an inwardly projecting portion disposable at least partially within the axial groove in the threaded shaft so as to prevent relative rotation between the shaft and the nut, and first and second elongated through-holes each having a width, the through-holes being generally aligned and spaced-apart so as to define an intermediate non-slotted material portion, the inwardly projecting portion of the locking plate being positioned non-symmetrically in relation to the intermediate non-slotted material portion, wherein the elongated through-holes of the locking plate are arranged to be in alignment with two adjacent threaded bores in the shaft nut, two bolts each having a head larger than the width of the elongated through-holes, each bolt being inserted through a separate one of the through-holes and screwed into one of the threaded bores in the shaft nut, the non-symmetrically positioned inwardly projecting portion of the locking plate enables adjustment of the locking plate along the length of the through-holes, wherein the arc length of each of the first and second elongated through holes is about $360°/(2 \times n)$, where n is the number of the threaded bores in the shaft nut.

8. A locking arrangement for securing a shaft nut on a threaded shaft, the nut having two, opposing side faces and the threaded shaft having an outer envelope surface, the locking arrangement comprising:

the threaded shaft having at least one axial groove provided in the outer envelope surface, a plurality of spaced apart threaded bores extending into the shaft nut from one of the two side faces, a locking plate having opposing sides separately disposeable against the shaft nut, a first end, a second end, an inwardly projecting portion disposable at least partially within the axial groove in the threaded shaft so as to prevent relative rotation between the shaft and the nut, and first and second elongated through-holes each having a width, the through-holes being generally aligned and spaced-apart so as to define an intermediate non-slotted material portion, the inwardly projecting portion of the locking plate being positioned non-symmetrically in relation to the intermediate non-slotted material portion, wherein the elongated through-holes of the locking plate are arranged to be in alignment with two adjacent threaded bores in the shaft nut, two bolts each having a head larger than the width of the elongated through-holes, each bolt being inserted through a separate one of the through-holes and screwed into one of the threaded bores in the shaft nut, the non-symmetrically positioned inwardly projecting portion of the locking plate enables adjustment of the locking plate along the length of the through-holes, wherein each of the elongated through holes has generally semicircular end walls and an angle between the centers of the semicircular end walls is one of 11.25° when the number n of threaded bores in the shaft nut is 16, 22.5° when the number n of threaded bores in the shaft nut is 8 and 45° when the number n of threaded bores in the shaft nut is 4.

* * * * *